(12) United States Patent
Sayyah et al.

(10) Patent No.: US 7,864,396 B1
(45) Date of Patent: Jan. 4, 2011

(54) VERTICAL CAVITY MULTIPLE QUANTUM WELL DEVICE WITH SIMULTANEOUS MODULATION AND PHOTODETECTION CAPABILITY

(75) Inventors: Keyvan Sayyah, Santa Monica, CA (US); Daniel Yap, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 888 days.

(21) Appl. No.: 11/591,319

(22) Filed: Oct. 31, 2006

(51) Int. Cl.
*G02F 1/03* (2006.01)
*G02F 1/07* (2006.01)
*G02B 26/00* (2006.01)
(52) U.S. Cl. .................. 359/248; 359/251; 359/290
(58) Field of Classification Search ............. 359/248, 359/251, 290, 291, 292, 298
See application file for complete search history.

(56) References Cited

U.S. PATENT DOCUMENTS 5,383,216 A * 1/1995 Takemi .................. 372/50.1
5,488,504 A * 1/1996 Worchesky et al. ......... 359/248
6,593,159 B1 * 7/2003 Hashimoto et al. ........... 438/22
6,977,954 B2 * 12/2005 Taylor et al. ............. 372/50.21

OTHER PUBLICATIONS

Kitayama, K.I., et al., "An approach to single optical component antenna base station for broad band millimeter wave fiber radio access system", IEEE Trans. Micorwave Theory and Techniques, vol. 48, No. 12, p. 2588 (2000).
Stohr, A., "Full duplex fiber radio RF subcarrier trnasmission using a dual function modulator/photodetector", IEEE Trans, microwave thoery and techniques, vol. 47, No. 12, p. 1338 (1999).

* cited by examiner

*Primary Examiner*—Ricky L Mack
*Assistant Examiner*—Brandi N Thomas
(74) *Attorney, Agent, or Firm*—Ladas & Parry

(57) ABSTRACT

A vertical cavity modulator/detector (VCMD) device and a method for modulating and detecting light are disclosed. The VCMD device contains an n-type contact layer, a transparent tuning layer, a multiple quantum well structure, a p-type contact layer, a low reflectance mirror arranged to be an input for a light that is to be modulated and a light that is to be detected, and a high reflectance mirror, wherein said n-type contact layer, said transparent tuning layer, said multiple quantum well structure and said p-type contact layer are arranged in a stack between said low reflectance mirror and said high reflectance back mirror.

16 Claims, 4 Drawing Sheets

VERTICAL CAVITY MULTIPLE QUANTUM WELL DEVICE WITH SIMULTANEOUS MODULATION AND PHOTODETECTION CAPABILITY

FIELD OF THE INVENTION

The present disclosure relates to optical modulators and photodetectors. More particularly, the present disclosure relates to a vertical cavity multiple quantum well device capable of simultaneously providing both an optical modulation function and a photodetection function.

BACKGROUND

Optical communication systems employ various photonic devices, such as photodetectors and optical modulators, for accomplishing a variety of processing tasks. Typically, these devices are separately packaged for integration into the optical communication system.

The photonics package typically includes, in addition to the photonics device, an optical fiber, a container in which the package resides, and an electrical header among other ancillary parts. The cost of such photonics packages is typically controlled, especially at high production volumes, by items other than the photonics device. For example, at high production volumes, the cost of some photodetector packages and optical modulator packages is dominated by the cost of the optical fiber included in such packages.

As such, it would be desirable to combine a number of photonic devices in a single package in order to reduce the dominant cost associated with interfacing multiple optical fibers to a number of devices and to reduce the cost of the photonic devices. This can be accomplished by integrating the photonic devices, as much as feasible, on a single photonic integrated circuit.

PRIOR ART

"An Approach to Single Optical Component Antenna Base Station for Broad-Band Millimeter-Wave Fiber-Radio Access System", By K. I. Kitayama et al., IEEE Trans. Microwave Theory and Techniques, Vol. 48, No. 12, 2000, p. 2588.

"Full-Duplex Fiber-Radio RF Subcarrier Transmission Using a Dual-Function Modulator/Photodetector", By A. Stohr, IEEE Trans. Microwave Theory and Techniques, Vol. 47, No. 12, 1999, p. 1338.

The dual-function modulator/photodetector fabricated and used in hybrid optical/RF links is a high-speed electroabsorption (EA) waveguide device operating at the 1550 nm band of the optical spectrum. The disadvantages of waveguide-based EA devices compared to the vertical cavity modulator/detector (VCMD) devices described in this disclosure are:

(1) More complex fabrication process resulting in costlier devices;
(2) Larger device lateral dimensions to have high modulation extinction ratios;
(3) Need for more complicated traveling-wave structures to achieve high simultaneous modulation speeds and extinction ratios;
(4) Polarization sensitivity between s- and p-polarized input optical beams;
(5) High optical insertion loss as a result of optical mode mismatch between the input optical fiber and the device waveguide structure.

DETAILED DESCRIPTION

According to the present disclosure a compact, solid-state, and potentially low cost device, vertical cavity modulator/detector (VCDM), can simultaneously function as both a high efficiency photodetector and a high contrast ratio and low insertion loss optical modulator.

A VCMD device, according to the present disclosure, is based on the multiple quantum well (MQW) electroabsorption effect functioning simultaneously as a high contrast ratio and low insertion loss modulator, and a high efficiency photodetector. The MQW electroabsorption structure may be placed in a vertical Fabry-Perot cavity together with a transparent semiconductor layer lattice matched to the MQW layers. The transparent layer may be used to tune the detection wavelengths of the VCMD without resulting in any additional loss in the on-state reflectivity of the VCMD. The Fabry-Perot cavity may be used to improve the on-off contrast ratio of the reflective modulator, as well as simultaneously provide additional resonance wavelengths where high efficiency photodetection occurs.

The vertical cavity structure according to the present disclosure is adapted to simultaneously perform as a high contrast ratio and low insertion loss optical modulator, and a high efficiency photodetector. According to the present disclosure, at the detection wavelength, the vertical cavity structure is adapted to null in reflection, hence trapping the incoming light and thereby enhancing the photodetection efficiency. This may be achieved regardless of the voltage applied to the vertical structure to operate as a high contrast ratio and low insertion loss optical modulator. According to the present disclosure, the vertical cavity structure may be adapted to use shorter wavelength cavity resonances for high efficiency photodetection by adding a transparent layer to the MQW in the cavity.

Figure 1:
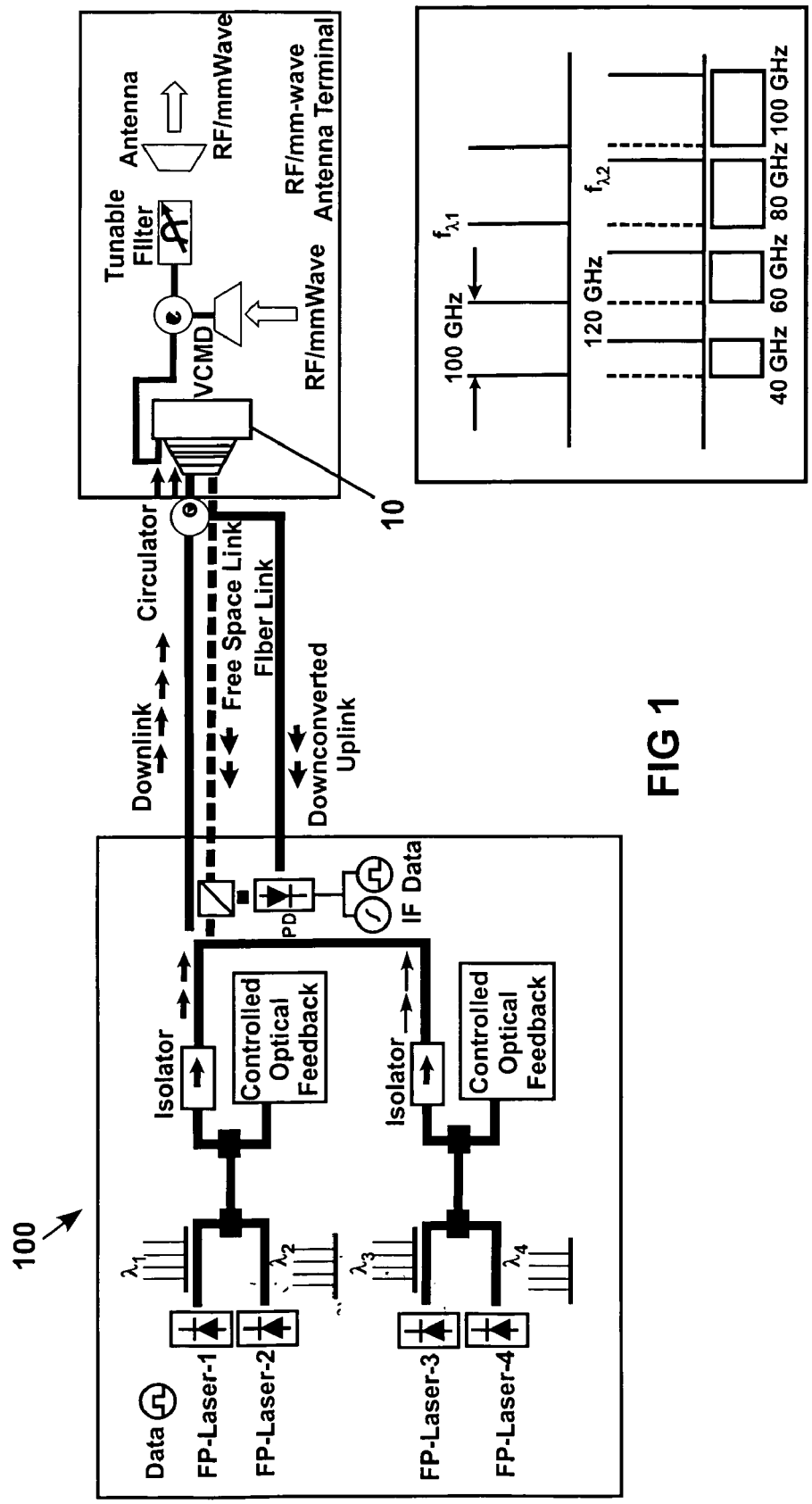
FIG. 1 depicts a hybrid optical/RF communication system.

VCDM devices can greatly benefit applications where both optical detectors and modulators are required, both in terms of compactness, packaging and cost. For example, VCDM devices can have many potential applications in both free space and fiber-based optical communication links and systems. As shown in FIG. 1, a VCMD device 10 can be used in a free space or fiber-based hybrid optical/RF communication system 100 as a key component of a simple and potentially low cost antenna terminal. The use of the VCMD device 10 as both a light modulator for the uplink signal and a high efficiency photodetector for the downlink signal greatly simplifies this antenna terminal.

Figure 2:
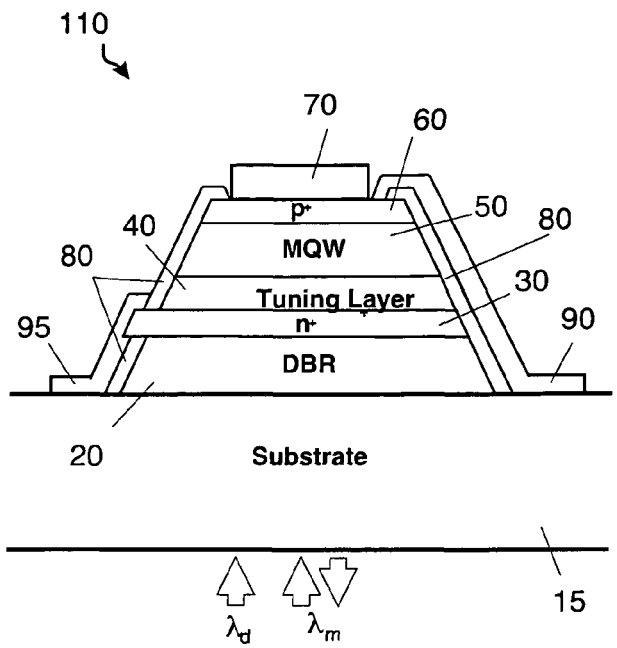
FIG. 2 depicts an exemplary embodiment of a vertical cavity modulator/detector (VCMD) device in accordance with the present disclosure.

Referring to FIG. 2, in an exemplary embodiment, a vertical cavity modulator/detector (VCMD) device 110 is shown. The VCMD device 110, disposed on a substrate 15, may consist of a low reflectance mirror 20, for example, an appropriately designed Distributed Bragg Reflector (DBR), an n-type contact layer 30, a transparent tuning layer 40, a MQW structure 50, a p-type contact layer 60, a high reflectance mirror 70, an insulating layer 80, a p-contact 90, and an n-contact 95. The low reflectance DBR mirror 20 and the high reflectance mirror 70 define the lower and upper boundaries of the VCMD device 110.

The MQW structure 50 within the VCMD device 110 may comprise a InGaAs/InAlAs multiple-quantum-well (MQW) optical modulator in a vertical asymmetric Fabry-Perot (AFP) cavity. The purpose of the AFP cavity is to improve the on-off contrast ratio of the reflective modulator. Although conventional MQW modulators have contrast ratios in the range of 2:1 or 3:1 due to the limited optical absorption of the MQW at the exciton resonance, placing the MQW modulator in the AFP cavity may enhance the contrast ratio to values well over 10:1. The enhancement in the contrast ratio is due to the almost complete nulling of the off-state reflection obtained by matching the front surface reflection and the opposite-phase back surface reflection of the modulator by adjusting its voltage-dependent absorption. The enhancement of the contrast ratio improves the bit-error-rate (BER) of optical transmission systems using the modulator.

The transparent tuning layer 40 within the VCMD device 110 may comprise, for example, an InP material or a lattice-matched quartenary InAlGaAs material, which are transparent at the modulation wavelength.

Implementation of the transparent layer 40 within the VCMD device 110 results in additional cavity resonances that are close to the modulation wavelength, and that can be used as detection wavelengths. The position of the resonances depends on the total thickness of the cavity, which in part may be controlled by the thickness of the transparent layer 40. Using the transparent layer 40 within the VCMD device 110 allows absorption of the light frequency to be detected independently of the modulation voltage applied to the VCMD device 110 for optimum modulation contrast ratio (extinction ratio). Because the transparent layer 40 is able to prevent reflectance of the light frequency to be detected, all of the light power is trapped in the cavity at these resonances, which allows maximum photodetection efficiency, given the internal quantum efficiency of the MQW structure.

The substrate 15 and n-type contact layer 30 may comprise, for example, an InP material while p-type contact layer 60 may comprise, for example, InGaAs material.

Figure 3:
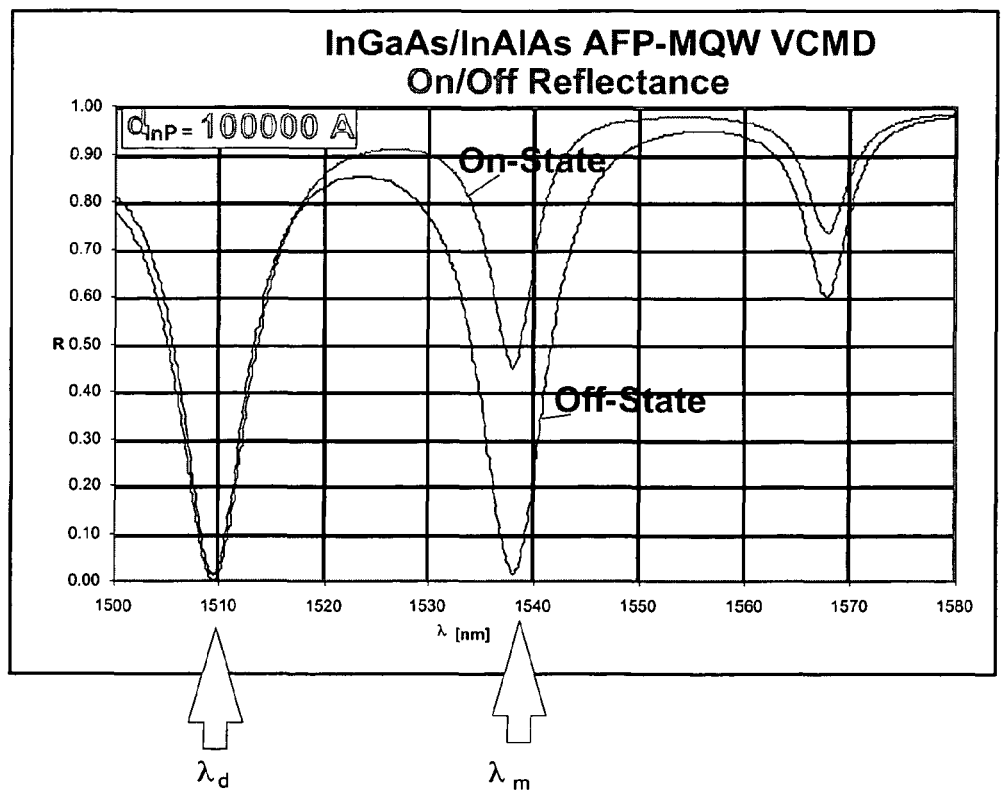
FIG. 3 depicts a simulation of the on and off-state reflection spectrum of the VCMD device in FIG. 2.

FIG. 3 shows a simulation of the on and off-state reflection spectrum of a VCMD device 110 with a modulation wavelength $\lambda_m$ of approximately 1540 nm and a detection wavelength $\lambda_d$ of approximately 1510 nm. These results were obtained using the VCMD device 110 comprising a MQW structure 50 composed of fifty (50) layers of eighty-eight angstrom (88 Å) thick InGaAs/fifty angstrom (50 Å) thick InAlAs material; a tuning layer 40 composed of ten (10) µm thick InP material; a n-type contact layer 30 composed of five-thousand angstrom (5000 Å) thick InP material; a p-type contact layer 60 composed of five-thousand angstrom (5000 Å) thick InAlAs material; a low reflectance DBR mirror 20 of zero-point-four (0.4); and the high reflectance back mirror 70 of zero-point-nine-five (0.95). At the detection wavelength $\lambda_d$, the incident light is fully absorbed independently of the modulation voltage applied to the structure for optimum modulation contrast ratio (extinction ratio). Because the reflectance of the incident light is fully nulled at the detection wavelength $\lambda_d$, as shown in FIG. 3, all of the light power is trapped in the cavity at these resonances, which allows maximum photodetection efficiency, given the internal quantum efficiency of the MQW structure. In contrast, if the same modulation wavelength $\lambda_m$ is used for photodetection as well, this photodetection efficiency may be reduced at modulation voltages which result in maximum reflectance (modulator on-state).

Figure 4:
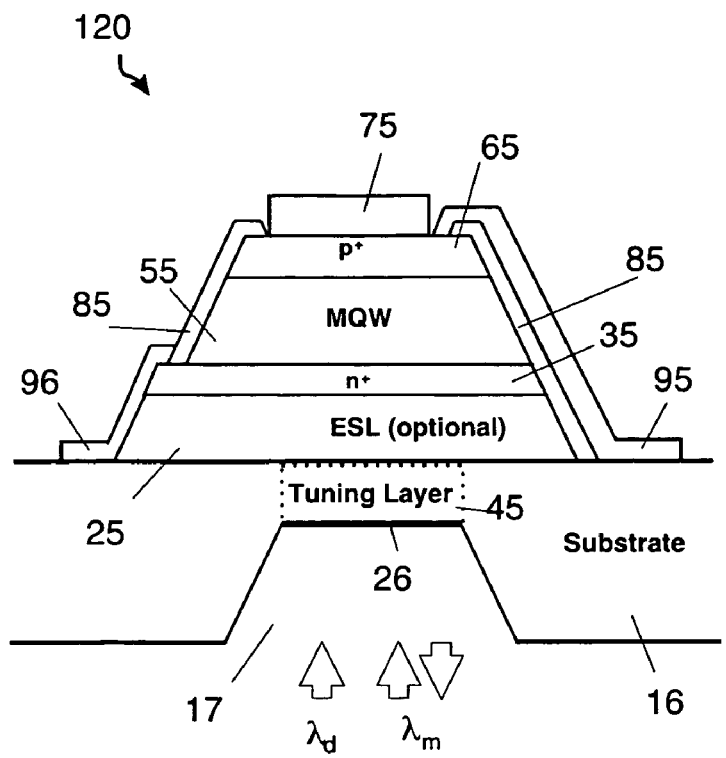
FIG. 4 depicts another exemplary embodiment of a vertical cavity modulator/detector (VCMD) device.

Referring to FIG. 4, another exemplary embodiment of a vertical cavity modulator/detector (VCMD) device 120 is shown. The VCMD device 120, disposed on a substrate 16 with a recess 17, may consists of an n-type contact layer 35, a MQW structure 55, a p-type contact layer 65, a high reflectance mirror 75, an insulating layer 85, a p-contact 95, and an n-contact 96. Unlike the VCMD device 110 described above, interface 26 between the air and the substrate 16 may act as the VCMD device 120's low reflectance mirror; and an area 45 composed of the substrate 16's material above the recess 17 may act as the VCMD device 120's transparent tuning layer. The VCMD device 120 may also contain an optional etch stop layer 25 to prevent the etching of the VCMD device 120 during the etching of the recess 17 in the substrate 16. The recess 17 reduces the thickness of the substrate 16 in the active area of the VCMD device 120 for optimization of the vertical cavity thickness of the Asymmetric Fabry-Perot (AFP) structure.

The MQW structure 55 within the VCMD device 120 may comprise a InGaAs/InAlAs multiple-quantum-well (MQW) optical modulator. The substrate 16 and n-type contact layer 35 may comprise an InP material while p-type contact layer 65 may comprise InGaAs material.

Figure 5:
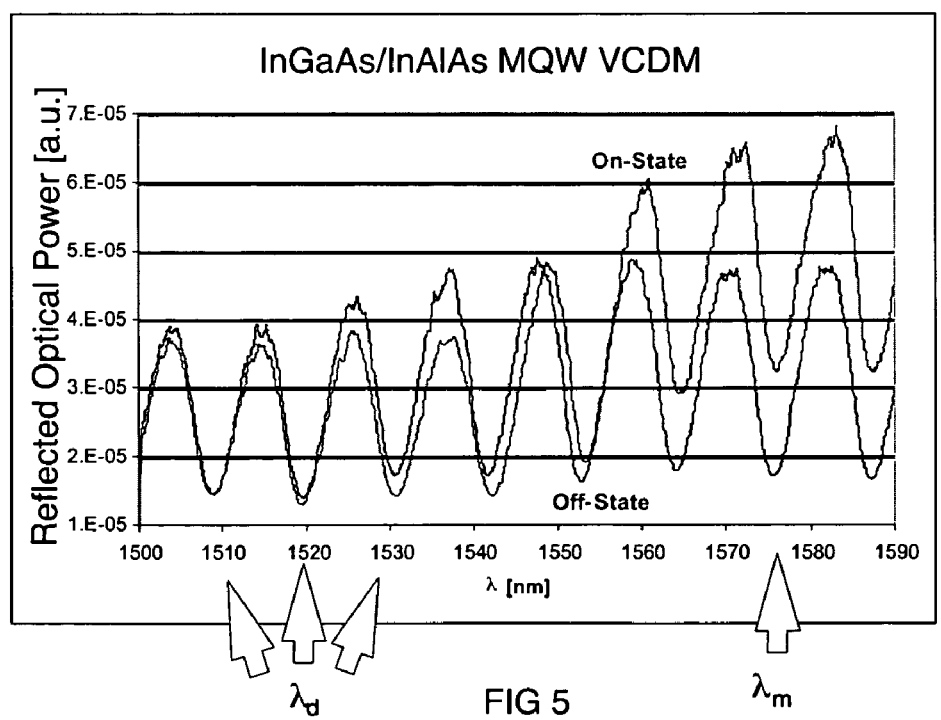
FIG. 5 depicts a measured reflectivity spectrum of the VCMD device in FIG. 4.

FIG. 5 shows the preliminary measured reflectivity spectrum of the VCMD device 120 with a modulation wavelength $\lambda_m$ of approximately 1575 nm and a detection wavelength $\lambda_d$ between 1510-1530 nm. These results were obtained using the VCMD device 120 comprising: a MQW structure 55 composed of a one-hundred (100) layer InGaAs/InAlAs MQW structure; a high reflectance mirror 75 composed of $Al_2O_3$/Si material with a reflectivity of over 0.90; a substrate 16 and air interface 26 having reflectance of 0.27; a n-type contact layer 35 composed of five-thousand angstrom (5000 Å) thick InP material; and a p-type contact layer 65 composed of five-thousand angstrom (5000 Å) thick InAlAs material.

Figure 6B:
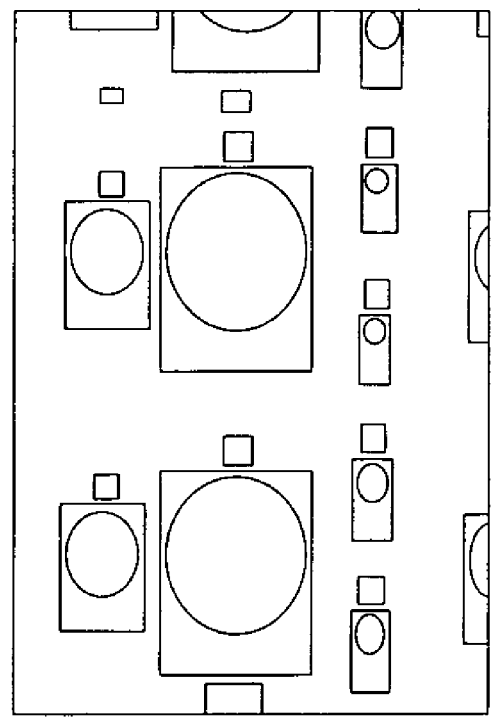
FIGS. 6a and 6b depict SEM and optical micrographs of the cross-section and top view of the fabricated VCMD device in FIG. 4.
Figure 6A:
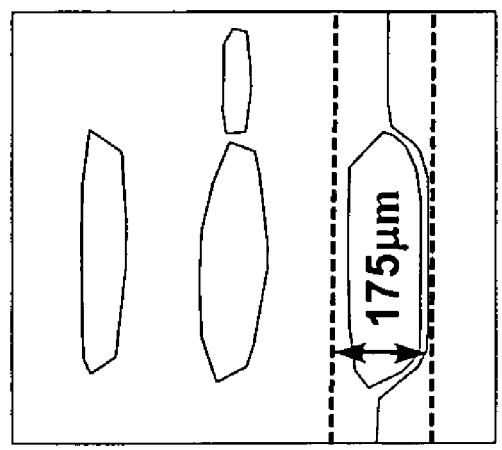

FIGS. 6a and 6b show Scanning Electron Microscopy (SEM) and optical micrographs of the cross-section and top view of the fabricated VCMD device 120, respectively.

While several illustrative embodiments of the invention have been shown and described, numerous variations and alternative embodiments will occur to those skilled in the art. Such variations and alternative embodiments are contemplated, and can be made without departing from the scope of the invention as defined in the appended claims.

The foregoing detailed description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the claims. No claim element herein is to be construed under the provisions of 35 U.S.C. Sec. 112, sixth paragraph, unless the element is expressly recited using the phrase "means for . . ." and no method or process step herein is to be construed under those provisions unless the step, or steps, are expressly recited using the phrase "step(s) for . . ."

What is claimed is:

1. A vertical cavity modulator/detector (VCMD) device comprising:
   a n-type contact layer;
   a substrate having a recess formed therein, a portion of said substrate being between said recess and said n-type contact layer, said portion of said substrate including a transparent tuning layer;
   a multiple quantum well structure;
   a p-type contact layer;
   a low reflectance mirror defined at an interface between said transparent tuning layer and said recess and positioned to enable light in said recess to penetrate into said transparent tuning layer; and
   a high reflectance mirror, said multiple quantum well structure being positioned between said high reflectance mirror and said transparent tuning layer;
   wherein said n-type contact layer, said transparent tuning layer, said multiple quantum well structure and said p-type contact layer are arranged in a stack between said low reflectance mirror and said high reflectance back mirror.

2. The VCMD device of claim 1, wherein said low reflectance mirror, said high reflectance mirror, said n-type contact layer, said transparent tuning layer, said multiple quantum well structure and said p-type contact layer are supported by a substrate.

3. The VCMD device of claim 1, wherein said transparent tuning layer comprises a substrate supporting said high reflectance mirror, said n-type contact layer, said multiple quantum well structure and said p-type contact layer.

4. The VCMD device of claim 3, wherein said substrate is formed with a recess.

5. The VCMD device of claim 1, wherein said multiple quantum well structure comprises InGaAs/InAlAs material system.

6. The VCMD device of claim 2, wherein said substrate, said n-type contact layer and said transparent tuning layer comprise InP.

7. The VCMD device of claim 1, wherein said p-type contact layer comprises InGaAs.

8. The VCMD device of claim 1, wherein said high reflectance mirror comprises $Al_2O_3/Si$ material.

9. A method for modulating and detecting light, said method comprising:
   selecting an n-type contact layer;
   selecting a substrate having a recess formed therein, a portion of said substrate being between said recess and said n-type contact layer, said portion of said substrate including a transparent tuning layer;
   selecting a multiple quantum well structure;
   selecting a p-type contact layer;
   selecting a low reflectance mirror;
   selecting a high reflectance mirror, wherein said n-type contact layer, said transparent tuning layer, said multiple quantum well structure and said p-type contact layer are arranged in a stack between said low reflectance mirror and said high reflectance back mirror, and wherein said multiple quantum well structure is positioned between said high reflectance mirror and said transparent tuning layer;
   passing light to be modulated through said low reflectance mirror; and
   passing light to be detected through said low reflectance mirror.

10. The method of claim 9, wherein said n-type contact layer, said transparent tuning layer, said multiple quantum well structure, said high reflectance mirror, said low reflectance mirror and said p-type contact layer are disposed on the substrate.

11. The method of claim 9, wherein said substrate supports said n-type contact layer, said transparent tuning layer, said multiple quantum well structure, said high reflectance mirror and said p-type contact layer.

12. A vertical cavity modulator/detector (VCMD) device comprising:
   a substrate having a recess formed therein, an interface between air within said recess and said substrate comprising a low reflectance mirror;
   an n-type contact layer disposed on said substrate above said recess, a portion of said substrate being between said recess and said n-type contact layer, said portion of said substrate including a transparent tuning layer;
   a multiple quantum well structure disposed on said n-type contact layer;
   a p-type contact layer disposed on said multiple quantum well structure; and
   a high reflectance mirror disposed on said p-type contact layer, said multiple quantum well structure being positioned between said high reflectance mirror and said transparent tuning layer.

13. The VCMD device of claim 12, wherein said recess is an input for a light to be modulated and for a light to be detected.

14. The VCMD device of claim 12, further comprising an etch stop layer disposed between said substrate and said n-type contact layer.

15. The VCMD device of claim 12, wherein said multiple quantum well structure comprises InGaAs/InAlAs.

16. The VCMD device of claim 12, wherein said substrate comprises InP.

* * * * *